United States Patent [19]
Hsu et al.

[11] Patent Number: 5,812,369
[45] Date of Patent: Sep. 22, 1998

[54] SOUND ACCESSORY FOR LAPTOP/ NOTEBOOK COMPUTERS

[75] Inventors: Wen Chuan Hsu, Chung-Ho, Taiwan; Youji Honda, Tokyo, Japan

[73] Assignee: Jazz Hipster, Inc., City of Industry, Calif.

[21] Appl. No.: 720,928

[22] Filed: Oct. 4, 1996

[51] Int. Cl.$^6$ .............................. G06F 1/16; H04R 5/00
[52] U.S. Cl. ........................... 361/683; 381/24; D14/113
[58] Field of Search .................................. 361/680, 681, 361/683, 686; 364/708.1; 381/24, 87, 88; D14/113, 114; G06F 1/16

[56] References Cited

U.S. PATENT DOCUMENTS

| | | | |
|---|---|---|---|
| D. 369,150 | 4/1996 | Vossoughi | D14/113 |
| 4,756,454 | 7/1988 | Villanueva et al. | 224/30 A |
| 4,901,355 | 2/1990 | Moore | 381/183 |
| 5,519,572 | 5/1996 | Luo | 361/685 |
| 5,550,921 | 8/1996 | Freadman | 381/24 |
| 5,588,063 | 12/1996 | Edgar | 381/24 |
| 5,604,663 | 2/1997 | Shin et al. | 361/686 |
| 5,606,594 | 2/1997 | Register et al. | 379/58 |
| 5,638,456 | 6/1997 | Conley et al. | 381/190 |

*Primary Examiner*—Lynn D. Feild
*Attorney, Agent, or Firm*—Fulbright & Jaworski LLP

[57] ABSTRACT

Sound producing apparatus in the form of a pair of speakers each having a clamp affixed thereto. The clamp in each case defines a pair of relatively moveable opposed jaws which may be opened to attach the speaker to the periphery of the monitor of a laptop/notebook type computer. The clamp is affixed to the housing of the speaker by an additional clamp in a manner which permits the speaker to be vertically adjusted after being attached to the monitor. The clamps are formed as an integral unit which includes a base member having first and second slide members slidably attached to oppositely disposed outwardly facing planar surfaces of the base member with a spring urging each of the slides into a clamped or holding position.

13 Claims, 3 Drawing Sheets

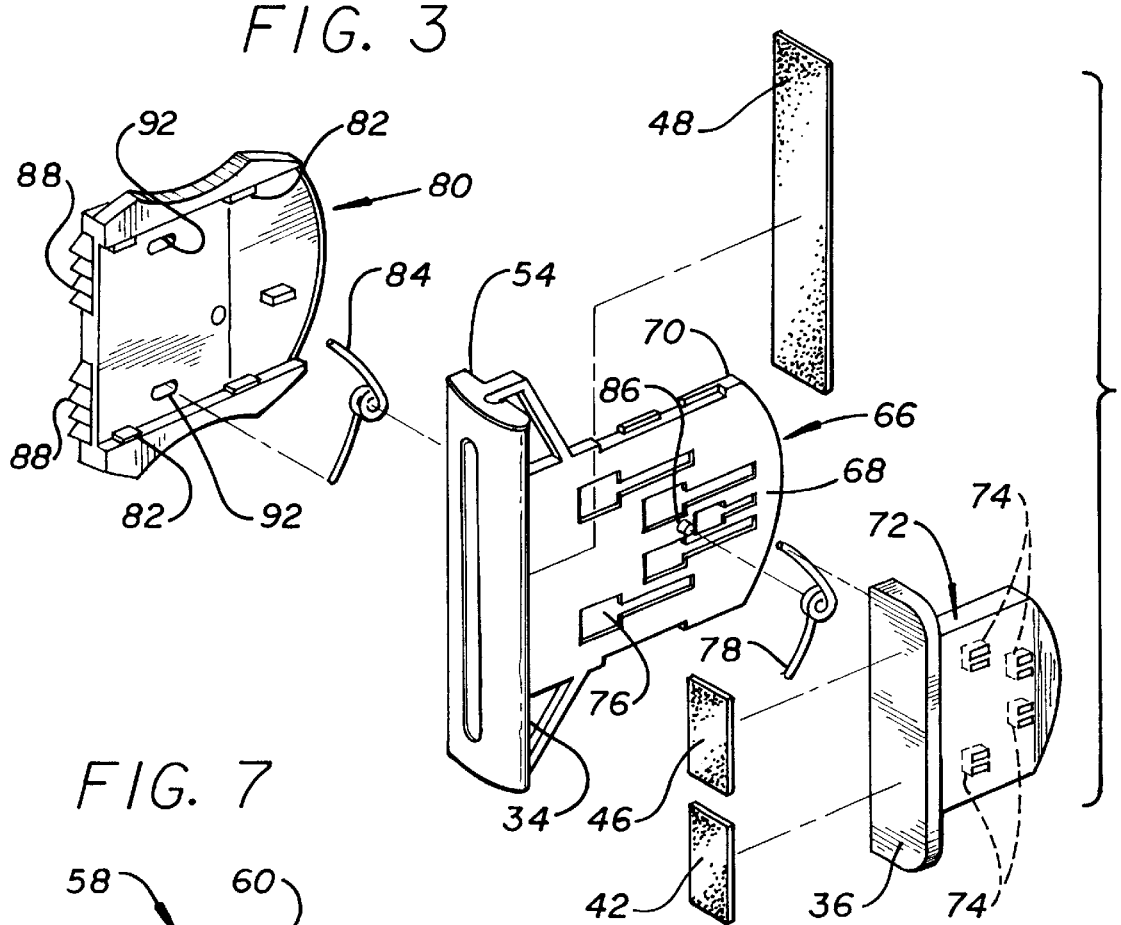
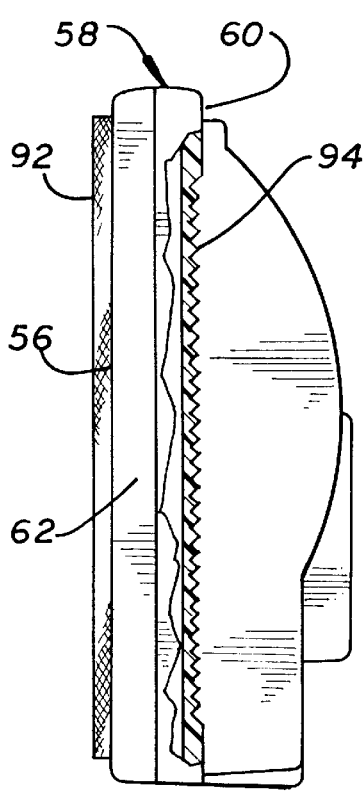
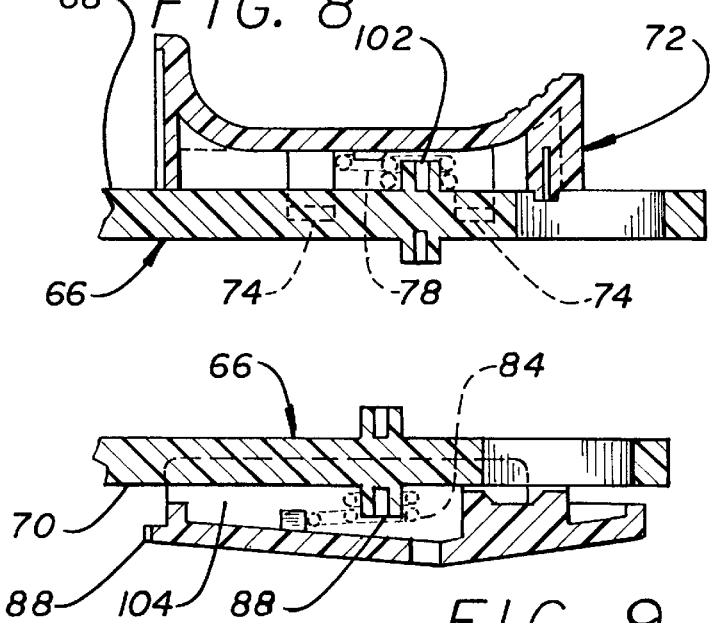

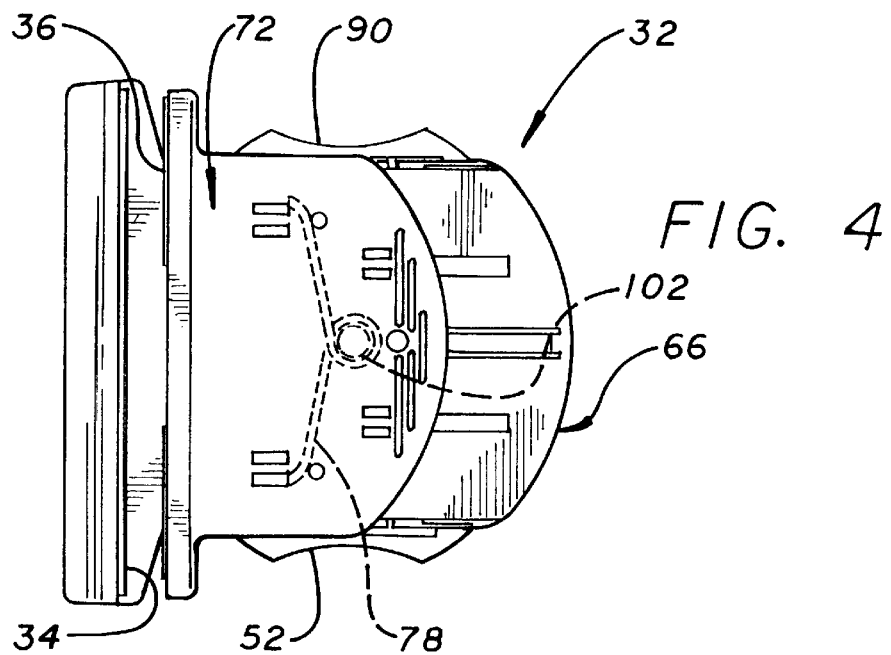
FIG. 4
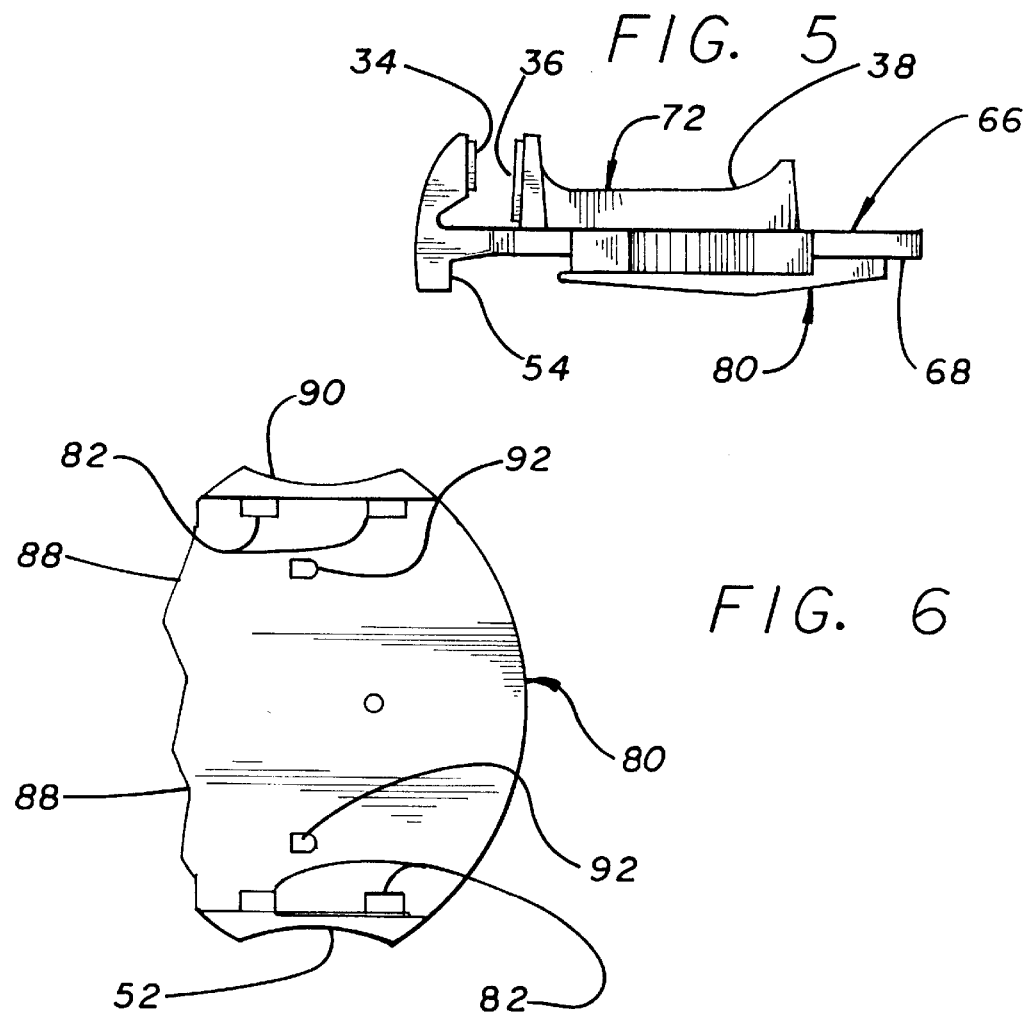
FIG. 5
FIG. 6

SOUND ACCESSORY FOR LAPTOP/NOTEBOOK COMPUTERS

BACKGROUND OF THE INVENTION

This invention relates generally to computers and more specifically to accessories which may be removably attached to laptop/notebook type computers to provide or enhance the audio capabilities of such computers.

It has become common to utilize audio capabilities with personal computers of all types including laptop/notebook type computers (hereinafter laptop). This capability is demanded as further expanded uses of personal computers becomes prevalent. Computer telephony now permits individuals to accomplish telephone communication through the Internet. Telephone conferencing is now a frequent occurrence and such also occurs through the Internet where the parties have computer telephony capabilities. If desired, music may be downloaded from the Internet into a computer database and upon command by the user reproduced though the audio capability of the computer. As is also well known to those skilled in the art, one can upon demand have a facsimile transmission which has been received reproduced in hard copy or audio as desired. Conferencing utilizing both video and audio is also available and as the hardware and software become more readily available and the costs decrease such video/audio conferencing and communication will become much more commonplace.

When utilizing a stand alone personal computer in an office environment the ability to utilize relatively high quality audio reproduction equipment is relatively easy and is quite common. However, when utilizing a typical laptop type of computer there is either no audio capability for such a device or if there is audio capability the speakers contained within the laptop type computer are of such low fidelity that in some cases the audio information is undecipherable.

SUMMARY OF THE INVENTION

An audio producing apparatus which may be removably attached to the periphery of a laptop-type computer monitor which apparatus includes a housing within which a sound reproduction means is contained and means affixed to said housing for attaching said apparatus to said monitor, the means for attaching comprising a retractable clamp.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 3 is an exploded view illustrating the means utilized for attaching the audio apparatus to the monitor of a laptop-type computer;

FIG. 4 is a side view of the attaching means;

FIG. 5 is a top view of the attaching means;

FIG. 6 is a bottom view illustrating a portion of the attaching apparatus as shown in FIG. 4;

FIG. 7 is a partial side view taken about the line 7—7 of FIG. 2;

FIG. 8 is a partial cross-sectional view of a first slide member; and

FIG. 9 is a partial cross-sectional view of a second slide member.

DETAILED DESCRIPTION OF THE PREFERRED EMBODIMENTS OF THE INVENTION

Figure 1:
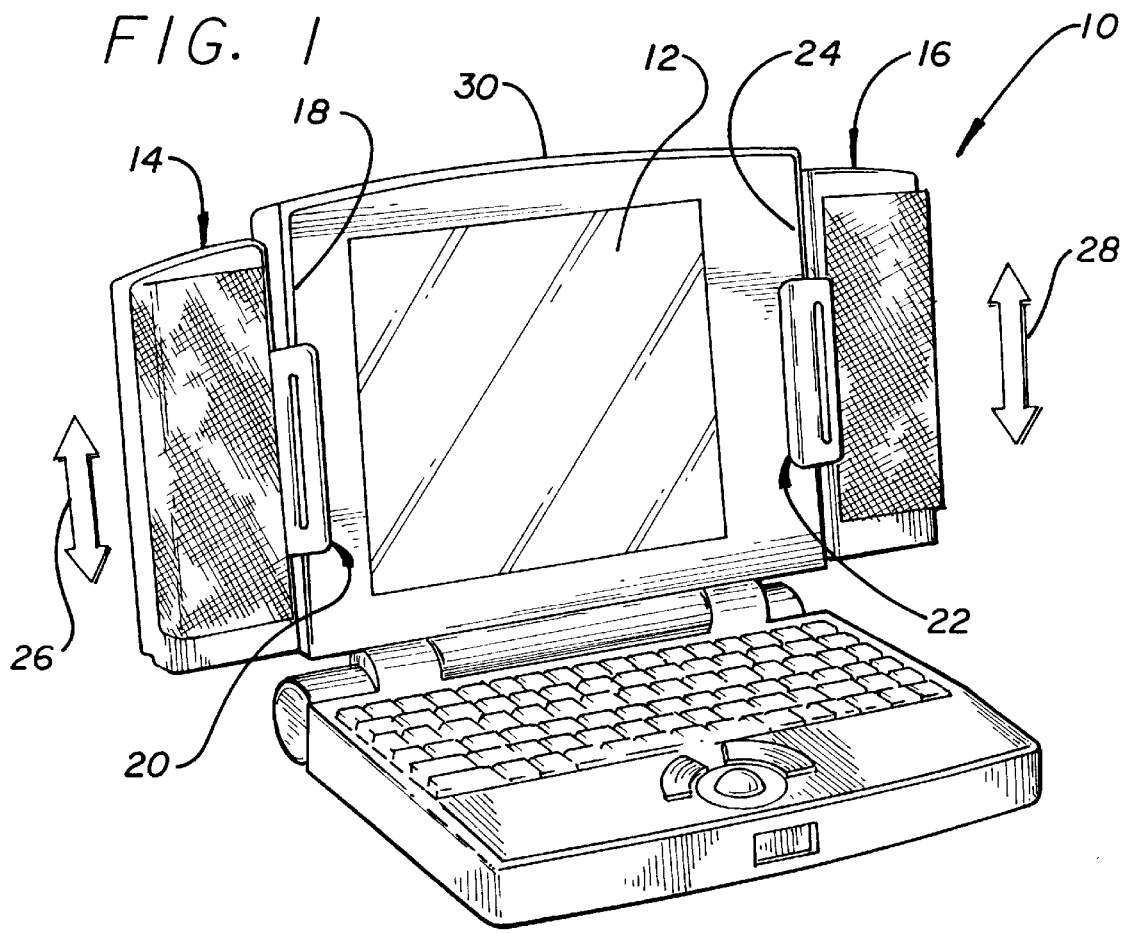
FIG. 1 is a perspective view showing the audio apparatus of the present invention attached to a laptop-type computer.

Referring now to the drawings and more particularly to FIG. 1, there is illustrated a laptop-type computer 10 which has its monitor 12 opened so as to be in an operative position. Affixed to the periphery of the monitor 12 is audio producing apparatus in the form of speaker enclosure housings 14 and 16. The left speaker enclosure housing 14 is attached to the left edge 18 of the monitor 12 by a means for afixing the speaker enclosure housing to the monitor in the form of a retractable clamp 20. A similar retractable clamp 22 is utilized to affix the speaker enclosure housing 16 to the right side 24 of the monitor 12. The speaker enclosures 14 and 16 are adjustable vertically while in their attached position as illustrated by the arrows 26 and 28, respectively. Although in FIG. 1 the audio producing apparatus in the form of the speaker enclosure housings 14 and 16 are shown affixed to the left and right side of the computer monitor 12, it should be understood by those skilled in the art that an alternative arrangement would be to attach a single speaker to the upper edge 30 of the monitor 12. Such alternative attachment may be such as to provide adjustment toward the left and the right if such is desired, but such an adjustment would not be a critical feature.

Obviously when the computer 10 is to be stowed for transport, the speaker enclosure housings 14 and 16 may be readily detachable from the edges 18 and 24 of the monitor by releasing the clamps 20 and 22, respectively. It can thus be seen that the audio producing apparatus of the present invention may readily be assembled and adjusted with respect to the computer monitor by the user. Such would then provide to the laptop computer user the same capabilities of a stand alone, personal computer and by attachment to the appropriate telephone lines, can be used to provide the audio capabilities for facsimile, music, the Internet, conferencing and computer telephony as above described with the same fidelity and clarity as exists with the standard personal computers in an office environment.

Figure 2:
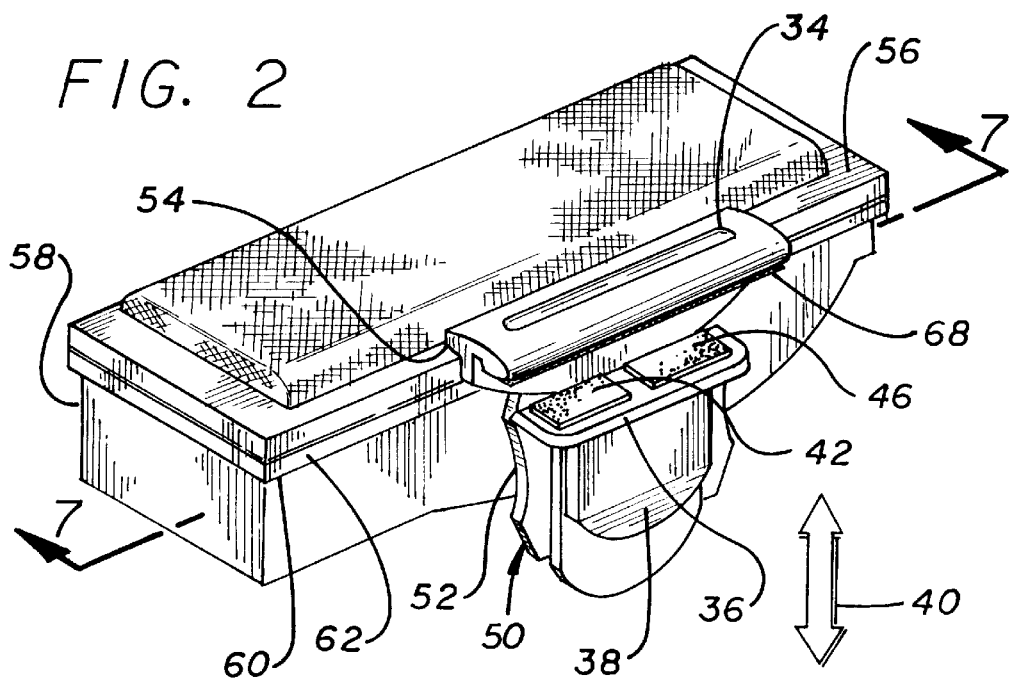
FIG. 2 is a perspective view illustrating the audio apparatus of the present invention detached from the laptop-type computer.

By reference, now more specifically to FIG. 2 there is shown in perspective view the right speaker enclosure housing 16 with the clamp 22 affixed thereto but with the speaker enclosure housing 16 removed from the monitor 12. As is shown in FIG. 2, the attaching apparatus 32 is attached to the housing 16 and includes a pair of jaws 34 and 36 are relatively movable and which may be displaced from a first position, as shown, by applying a force to a thumb depression 38 to move the jaw 36 downwardly as illustrated by the arrow 40 to a second position. When the opposed jaws are in the first position the apparatus may be affixed to the periphery of the monitor 12 and when they are in the second position the apparatus may be in the act of being removed from or affixed to the monitor. The jaw 36 is spring loaded to continuously provide pressure in a direction opposite to the arrow 40. With the jaw 36 moved downwardly to thus provide appropriate space between the jaws 34 and 36, the jaws are positioned so as to be on opposite sides of the cover holding the monitor 12 of the computer 10. The downward force 40 is removed from the thumb depression 38 thus allowing the spring to move the jaw 36 toward the jaw 34 thereby clamping the housing 16 to the edge 24 of the monitor 12. Elastomeric material in the form of a pair of pads 42 and 46 are provided on the jaw 36 and an additional pad 48 of elastomeric material is provided along the length of the jaw 34 to preclude the jaws from scaring or disfiguring the edge 24 of the monitor 12.

As will be more fully described hereinbelow, there is also provided an additional clamp 50 which may be moved downwardly by grasping a pair of serrated finger depressions one of which is shown at 52 with an additional one on the opposite side from that shown in FIG. 2. The additional clamping member 50 can then be moved downwardly to allow the positioning of an upper gripping member 54 along an upper edge 56 of the enclosure housing 16. Upon release the additional clamping means 50 will move upwardly to engage the lower edge 60. The upward and lower edges are separated by an inner edge 62 against which the clamping means rests. It is in this manner that the clamping means 32 is removably attached to the audio producing apparatus housing 16.

By reference now more particularly to FIG. 3, the clamping apparatus 32 is shown in exploded view. As is therein shown, there is provided a base member 66 having first and second substantially planar surfaces 68 and 70. The base member 66 also has extending therefrom the jaw 34 and the gripping member 54 as above described. As can be seen the jaw 34 extends outwardly substantially perpendicular from the first planar surface 68 and may be formed as an integral part of the base member 66. The gripping member 54 extends outwardly substantially perpendicular from the second planar surface 70 and may be formed as an integral part of the base member 66. Preferably the base member 66, jaw 34 and gripping member 54 are formed from a unitary molded plastic member with jaw 34 and gripping member 56 extending across one end to form a T appearing member as is more evident in FIG. 4. The pad 48 is affixed to the inter surface of the jaw 34 as above described. The lower jaw 36 has the pads 42 and 46 affixed thereto and is formed as an integral part of a first slide member 72 which is slidably engaged upon the planar surface 68 of the base 66. The slide 72 is maintained in position and permitted to slide by the fingers 74 which engage the slots 76 formed in the base 68. A spring 78 is secured on an appropriate post 86 formed on the surface 68 of the base member 66 to constantly urge the slide 72 in a direction such that the jaws 34 and 36 will tend to close.

There is also provided the second clamp means as above described in the form of a second slide member 80 which is slidably secured to opposite edge surfaces of the base 66 by appropriate fingers 82 which engage recessed areas in the edge surfaces of the base 66. A second spring 84 is secured in place upon an appropriate post 102 formed on the surface 70 of the base 66 and held between the slide 80 and the surface 70 of the base 66. The slide 80 also defines a plurality of teeth 88 which function to engage a serrated grove 94 (that will be more fully described herein below) formed in the housing 16. The spring 84 constantly urges the teeth 88 toward the clamping member 54 so that when the clamping means 32 is secured to the housing 16, the teeth 88 will engage the serrations 94.

The clamping means 32 is shown in assembled fashion in FIGS. 4 and 5 to which reference is hereby made. FIG. 4 is a side view illustrating the jaws 34 and 36 with the slidable member 72 in place upon the first planar surface 68 of the base 66. The slidable member 80 is shown in place on the opposite planar surface 70 of the base member 66. It should be recognized that the base member 66 forms not only the two oppositely facing planar surfaces 68 and 70 which receive the two slidable members 80 and 72 respectively but also forms the jaw 34 and the gripping surface 54 integrally therewith. Also more clearly shown is the thumb depression 38 which enables the user to move the slide member 72 from its first position as shown to the right as viewed in FIG. 4.

Referring now more particularly to FIG. 5 which is a top view of the structure shown in FIG. 4, the finger depressions 52 and 90 on the slidable member 80 are more clearly shown. In addition, the positioning of the spring 78 is shown in phantom between the slidable member 72 and the base 66.

FIG. 6 illustrates more in detail the slidable member 80 and illustrates the teeth 88 formed thereon along with the finger depressions 90 and 52. Also more clearly illustrated are the posts 92 formed within the cavity 93 upon which the ends of spring 84 rest.

Referring now more particularly to FIGS. 8 an 9, there is illustrated the two slides 72 and 80 in partial cross-section to further illustrate the manner in which they are constructed and operate.

As is shown in FIG. 8, the slide 72 defines an internal cavity 100 which receives the spring 78. The fingers 74 are disposed within slots as shown at 76 in FIG. 3 as above described. The surface 68 of the base member 66 closes the cavity 100 so as to trap the spring 78 therein and to provide the sliding operation of the slide 72 with respect to the base member 66 as above described.

Referring now more particularly to FIG. 9, the structure for the second slide 80 is also illustrated. As is therein shown, a cavity 104 is formed within the slide 80. The post 86 formed on the base 66 and which receives the spring 84 as above described is illustrated. The surface 70 of the base member 66 closes the cavity 104 to capture the spring 84 therein and to thus provide the sliding operation of the slide 80 with respect to the base member 66 as above described.

By reference now more particularly to FIG. 7, the enclosure housing 58 is shown with the speaker screen 92 over the front thereof As is shown in the partial sectional area there is a corrugated ridge 94 which extends along a substantial portion of the surface 60 of the inner edge 62 of the speaker enclosure housing. It will be recognized that the gripping member 54 engages the upper edge 56 while the teeth 88 engage the serration 94. When the clamping apparatus 32 is in position upon the housing 16, the speaker housing 16 may be moved to any position desired by the user as illustrated by the arrow 28 in FIG. 1.

It should now become readily apparent to those skilled in the art that the clamping apparatus 32 may be affixed to the housing 16 by moving the slide 80 downwardly as viewed in FIG. 2 upon grasping the finger depressions 52 and 90 and exerting a downward force. The gripping member 54 can then be placed upon the edge 56. Thereafter by releasing the pressure on the finger depressions 52 and 90 the spring 84 moves the teeth 88 into engagement with the serrations 94. Thereafter, by applying the appropriate downward force 40 to the thumb depression 38 on the slidable member 72, the jaws 34 and 36 can be caused to open to allow the audio producing apparatus to be affixed to the edge 22 of the monitor 12. Upon release of the pressure from the thumb depression 38 the jaws 34 and 36 will close as a result of the force of the spring 78 thus clamping the audio producing apparatus in the form of the speaker enclosure 16 to the outer periphery of the monitor 12. By simply reversing this process the speaker enclosure 16 can be removed from the monitor 12 relatively easily. Obviously the descriptive material with regard to the audio producing apparatus 16 is directly applicable to the audio producing apparatus 14 and is effectively the mirror image thereof There has thus been disclosed an audio producing apparatus which may be utilized with a laptop/notebook-type of computer to either enhance the audio qualities and capabilities thereof or provide such audio capabilities in the event the laptop/notebook-type computer does not include speakers therein. Obviously, an audio card must be added to any such computer not having audio capability in order to utilize the capabilities of the speakers of the present invention.

From the foregoing detailed description, it will be evident that there are a number of changes, adaptations and modifications of the present invention which comes within the province of those skilled in the art. However, it is intended that all such variations not departing from the spirit of the invention are considered as within the scope thereof as limited solely by the claims appended hereto.

What is claimed is:

1. An audio producing apparatus for use with a laptop/notebook-type computer monitor, said monitor having a periphery, said audio producing apparatus comprising:
   (a) a housing within which a sound reproducing means is contained;
   (b) means affixed to said housing for attaching said audio producing apparatus to said monitor periphery, including first and second opposed jaws relatively moveable from a first position for clamping said audio producing apparatus to said periphery of said computer monitor and toward a second position to permit removal of said audio producing apparatus from said monitor;
   (c) a base member having first and second surfaces;
   (d) said first of said opposed jaws extending outwardly in a first direction from said first surface of said base member;
   (e) a slidable member slidably disposed upon said first surface of said base member, said second opposed jaw being carried by said slidable member; and
   (f) means urging said first and second jaws toward each other.

2. The apparatus as defined in claim 1 wherein said first jaw is formed integrally with said base member and said second jaw is formed integrally with said slidable member.

3. The apparatus as defined in claim 2 wherein said means urging said opposed jaws together is a spring disposed between opposed surfaces of said slidable member and said first surface of said base member, said opposed surface of said slidable member defining a recess, said spring being received with said recess.

4. The apparatus as defined in claim 3 which further includes elastomeric material disposed upon said opposed jaws to protect said periphery of said computer monitor when said jaws are closed thereon.

5. An audio producing apparatus for use with a laptop/notebook-type computer monitor, said monitor having a periphery, said audio producing apparatus comprising:
   (a) a housing within which a sound reproducing means is contained; and
   (b) means affixed to said housing for attaching said audio producing apparatus to said monitor periphery, said means including a retractable clamp having a gripping surface and an opposed ridge defining a plurality of teeth, said gripping surface and opposed ridge being relatively moveable to affix said means for attaching to said housing.

6. The apparatus as defined in claim 5 which further includes a base member having first and second surfaces, said gripping surface extending from said second surface of said base member, said teeth being defined by a slidable member held in position upon said second surface of said base member.

7. The apparatus as defined in claim 6 further including means constantly urging said teeth toward said gripping surface for retaining said means for attaching upon said housing.

8. The apparatus as defined in claim 7 wherein said housing defines a corrugated surface, said teeth engaging said corrugated surface when said means for attaching is affixed to said housing.

9. An audio producing apparatus for use with a laptop/notebook-type computer monitor, said monitor having a periphery, said audio producing apparatus comprising:
   (a) a housing within which a sound reproducing means is contained;
   (b) means affixed to said housing for attaching said audio producing apparatus to said monitor periphery comprising:
     (1) a base member having first and second outwardly disposed surfaces,
     (2) means extending outwardly from said first surface and defining a first jaw,
     (3) a first slidable member disposed upon said first surface of said base member and defining a second jaw opposed said first jaw,
     (4) a first spring continuously urging said first and second jaws towards each other,
     (5) means defining a clamping surface extending from said second surface of said base member,
     (6) a second slidable member disposed upon said second surface of said base member and defining a plurality of teeth disposed opposed said clamping surface, and
     (7) a second spring continuously urging said teeth towards said clamping surface.

10. The apparatus as defined in claim 9 wherein said means defining said first jaw and said clamping surface is formed integral with said base member.

11. The apparatus as defined in claim 10 wherein said first and second jaws carry elastomeric material thereon.

12. The apparatus as defined in claim 10 wherein said first slidable member defines a first cavity therein, said first spring being seated within said first cavity, said first cavity being closed by said first surface of said base member.

13. The apparatus as defined in claim 12 wherein said second slidable member defines a second cavity, said second spring being seated within said second cavity and said second surface of said base member closing said second cavity.

* * * * *